United States Patent
Bi et al.

(10) Patent No.: US 9,653,817 B2
(45) Date of Patent: May 16, 2017

(54) ARRAY ANTENNA AND BASE STATION

(71) Applicant: CHINA TELECOM CORPORATION LIMITED, Beijing (CN)

(72) Inventors: Qi Bi, Morris Plains, NJ (US); Weiliang Xie, Beijing (CN); Tao Yang, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 48 days.

(21) Appl. No.: 14/431,696

(22) PCT Filed: Sep. 28, 2012

(86) PCT No.: PCT/CN2012/082243
§ 371 (c)(1),
(2) Date: Mar. 26, 2015

(87) PCT Pub. No.: WO2014/047858
PCT Pub. Date: Apr. 3, 2014

(65) Prior Publication Data
US 2015/0255881 A1    Sep. 10, 2015

(51) Int. Cl.
*H01Q 21/00* (2006.01)
*H01Q 21/06* (2006.01)
(Continued)

(52) U.S. Cl.
CPC .......... *H01Q 21/061* (2013.01); *H01Q 1/246* (2013.01); *H01Q 21/26* (2013.01); *H04B 7/0456* (2013.01);
(Continued)

(58) Field of Classification Search
CPC .......... H01Q 3/26; H01Q 21/08; H01Q 1/246; H01Q 21/065; H01Q 21/0025
(Continued)

(56) References Cited

U.S. PATENT DOCUMENTS 6,304,214 B1    10/2001    Aiken et al.
6,760,603 B1 *   7/2004    Scherzer ............... H01Q 1/246
                                                             343/725
(Continued)

FOREIGN PATENT DOCUMENTS

CN    101335910 A    12/2008
CN    101635391 A     1/2010
(Continued)

OTHER PUBLICATIONS

Mar. 8, 2016—(EP)—Supplementary European Search Report Appn 12885274.6.
(Continued)

*Primary Examiner* — Huedung Mancuso
(74) *Attorney, Agent, or Firm* — Banner & Witcoff, Ltd.

(57) ABSTRACT

An array antenna and a base station are provided. The array antenna comprises a plurality of linear arrays, uplink-downlink duplexers, and beam-forming networks. Each linear array is a dual-polarized linear array. An input end of the beam-forming network is coupled with a downlink signal output end of a RF (Radio Frequency) unit, and two output ends of the beam-forming network are respectively coupled with downlink signal transmitting ends of two uplink-downlink duplexers; transceiving ends shared by two uplink-downlink duplexers are respectively coupled with arrays having the same polarization direction of two adjacent linear arrays, and the two arrays having the same polarization direction form a beam with 65-degree beamwidth on the downlink through the beam-forming network; uplink signal output ends of the two uplink-downlink duplexers are coupled with uplink signal input ends of the RF unit; linear arrays uncoupled with uplink-downlink duplexers in the plurality of linear arrays are all coupled with the uplink signal input ends of the RF unit respectively.

(Continued)

Thereby, a beam with 65-degree beamwidth may be formed by a transmitting antenna on a downlink.

8 Claims, 4 Drawing Sheets

(51) Int. Cl.
    *H01Q 1/24* (2006.01)
    *H04W 16/28* (2009.01)
    *H01Q 21/26* (2006.01)
    *H04B 7/0456* (2017.01)
    *H04B 7/06* (2006.01)
    *H04B 7/10* (2017.01)

(52) U.S. Cl.
    CPC ............. *H04B 7/0617* (2013.01); *H04B 7/10* (2013.01); *H04W 16/28* (2013.01)

(58) Field of Classification Search
    USPC ................. 343/853, 844, 702, 700 MS, 797; 455/561
    See application file for complete search history.

(56) References Cited

U.S. PATENT DOCUMENTS

| | | | |
|---|---|---|---|
| 6,937,206 B2 * | 8/2005 | Puente Baliarda | H01Q 1/246 343/700 MS |
| 7,538,740 B2 * | 5/2009 | Korisch | H01Q 1/246 343/844 |
| 8,416,142 B2 * | 4/2013 | Gottl | H01Q 1/246 343/797 |
| 8,692,730 B2 * | 4/2014 | Shimizu | H01Q 1/246 343/758 |
| 8,798,679 B2 * | 8/2014 | Shimizu | H01Q 1/246 343/758 |
| 2007/0205955 A1 | 9/2007 | Korisch et al. | |
| 2010/0135420 A1 | 6/2010 | Xu et al. | |

FOREIGN PATENT DOCUMENTS

| | | |
|---|---|---|
| CN | 101789812 A | 7/2010 |
| EP | 1314223 A1 | 5/2003 |
| JP | 2001177338 A | 6/2001 |
| JP | 2001518265 A | 10/2001 |
| WO | 2011103919 A1 | 9/2011 |

OTHER PUBLICATIONS

International Search Report mailed Jun. 27, 2013(PCT/CN2012/082243); ISA/CN.

* cited by examiner

ARRAY ANTENNA AND BASE STATION

This application is a U.S. National Phase Entry of International Application No. PCT/CN2012/082243 filed on Sep. 28, 2012, designating the United States of America. The present application claims priority to and the benefit of the above-identified application and the above-identified application is incorporated by reference herein in its entirety.

TECHNICAL FIELD

The present disclosure relates to mobile communication, and more specifically, to an array antenna and a base station.

BACKGROUND

The Mobile communication network has evolved to the third generation (3G), and there are worldwide large-scale deployments of 3G networks and industry applications thereof. With the continuous population and promotion of data services and the Mobile Internet, the International Organization for Standardization is developing mobile communication LTE and the fourth generation (4G) and other technical standards, to meet the increasing development of network technology and service capacity. Because the MIMO (Multiple Input Multiple Output) technology may sufficiently take advantage of separate spatial transmission paths to greatly increase network service speed and link performance, it has become one of the cores of LTE and future 4G technology. The MIMO technology seeks to improve network service quality through deploying and establishing a plurality of antennas and adopting MIMO signal processing techniques. Generally, a LTE system requires a configuration of at least 2×2 MIMO or even more, for example, a TDD (Time Division Duplexing) LTE system generally requires 8 antennas to ensure the operational performance of MIMO.

With regard to 8 FDD (Frequency Division Duplex) antennas, in the MIMO mode, it is necessary to make the half power beamwidth of beams radiated from downlink transmission antennas of the 8 antennas be 65-degree. However, as shown in FIG. 1, various linear arrays in an array antenna are arranged side by side and severe cross-couplings will appear between any two linear arrays because of the very narrow space therebetween, therefore, it is highly possible that the beamwidth of the beam radiated from a downlink of each linear array will exceed 65 degrees, or even up to 80-90 degrees, which will result in that the constraint that the beamwidth of the beam should be 65-degree cannot be satisfied.

SUMMARY

A technical probe to be solved in the disclosure is to provide an array antenna and a base station, capable of forming beams with 65-degree beamwidth on downlinks by transmitting antennas, while still retaining the capability of 8-antenna reception on uplinks.

According to an aspect of the disclosure, an array antenna is provided, comprising a plurality of linear arrays, uplink-downlink duplexers, and beam-forming networks. Each linear array is a dual-polarized linear array which includes a positive-polarized array and a negative-polarized array. An input end of the beam-forming network is coupled with a downlink signal output end of a RF (Radio Frequency) unit, and two output ends of the beam-forming network are respectively coupled with downlink signal transmitting ends of two uplink-downlink duplexers; transceiving ends shared by two uplink-downlink duplexers are respectively coupled with arrays having the same polarization direction of two adjacent linear arrays, and the two arrays having the same polarization direction form a beam with 65-degree beamwidth on the downlink through the beam-forming network; uplink signal output ends of the two uplink-downlink duplexers are coupled with uplink signal input ends of the RF unit; linear arrays uncoupled with uplink-downlink duplexers in the plurality of linear arrays are all coupled with the uplink signal input ends of the RF unit respectively.

According to another aspect of the disclosure, a base station is further provided, comprising the array antenna described above.

In the array antenna and base station provided in the disclosure, an uplink and a downlink are distinguished by using an uplink-downlink duplexer for two adjacent linear arrays in the plurality of linear arrays, and a beam with 65-degree beamwidth is formed on a downlink by using a beam-forming network and two positive-polarized/two negative-polarized arrays having the same polarization direction in the two adjacent linear arrays, which prevents beams radiated from individual linear arrays from being over-wide when the beams are directly radiated from the individual linear arrays on the downlinks. Meanwhile, two adjacent linear arrays may be used for transceiving by the usage of uplink-downlink duplexers, and thereby diversity effect of multiple uplink antennas may be effectively guaranteed.

BRIEF DESCRIPTION OF THE DRAWINGS

Drawings illustrated herein, which are part of this application, are provided for a better understanding of the disclosure, in which.

DETAILED DESCRIPTION

The present disclosure will be further illustrated below in details in conjunction with the accompanying drawings with exemplary embodiments. It is to be understood that the following Detailed Description is merely exemplary, rather than to limiting the present disclosure inappropriately.

It is to be understood that the following Detailed Description to at least one exemplary embodiment is merely illustrative, rather than to being any limitation to the present disclosure and its any applications/usages.

In order to address the problem of over-wide downlink beamwidth of various linear arrays in a LTE FDD array antenna, a beam with 65-degree beamwidth is formed on a downlink through using a beam-forming network on downlink signal output ends of some linear arrays, so as to meet the use requirement of a sectored antenna.

Figure 2:
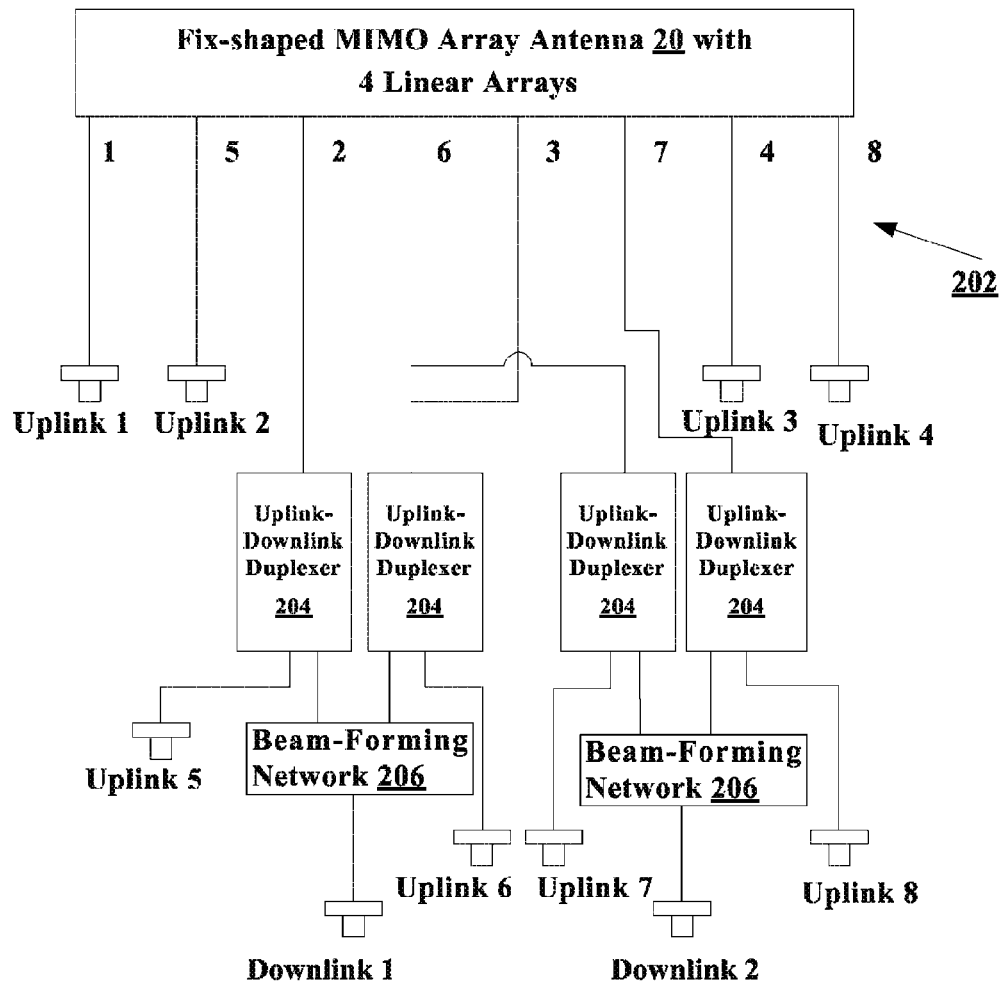
FIG. 2 is a structural diagram of the array antenna according to an embodiment of the disclosure.

FIG. 2 is a structural diagram of an array antenna according to an embodiment of the disclosure.

As shown in FIG. 2, an Array Antenna 20 may comprise a plurality of Linear arrays 202, Uplink-Downlink Duplexers 204 and Beam-Forming Networks 206.

Wherein, the number of the linear arrays of antenna may be the n power of 2 (n is a positive integer). Next, a description will be given with 4 linear arrays as an example.

Each linear array is a dual-polarized linear array comprising a positive-polarized array and a negative-polarized array. For example, the first linear array comprises a Positive-Polarized Array 1 and a Negatively-Polarized Array 5, the second linear array comprises a Positive-Polarized Array 2 and a Negative-Polarized Array 6, the third linear array comprises a Positive-Polarized Array 3 and a Negatively-Polarized Array 7 and the fourth linear array comprises a Positive-Polarized Array 4 and a Negative-Polarized Array 8. Each positive-polarized array or negative-polarized array comprises at least two antenna elements (see FIG. 1, which is not shown in FIG. 2).

The input end of Beam-Forming Network 206 is coupled with a downlink signal output end of a RF (Radio Frequency) unit, and the two output ends of the Beam-Forming Network 206 are coupled with downlink signal transmitting ends of two Uplink-Downlink Duplexers 204 respectively.

The shared transceiving ends of the two Uplink-Downlink Duplexers 204 are respectively coupled with arrays having the same polarization direction in two adjacent linear arrays, and the arrays having the same polarization direction in the two adjacent linear arrays form a beam with 65-degree beamwidth on a downlink through the Beam-Forming Network 206, in the case of adopting two arrays having the same polarization direction to form a beam with 65-degree beamwidth, in general, the beamwidth of beam formed by each linear array is controlled to be about 90 degrees and then the beams with 90-degree beamwidth are combined through a beam-forming network to be transformed to a beam with 65-degree beamwidth. To form a beam with 90-degree beamwidth, a regular scheme may be implemented by adjusting the backplate width and the sidewall height of the antenna, the backplate width is generally 0.4~0.6 wavelength, and the sidewall height is generally 8 mm~14 mm.

The uplink signal output ends of two uplink-downlink duplexers are coupled with the uplink signal input ends of a RF unit. Linear arrays uncoupled with uplink-downlink duplexers in the plurality of linear arrays (such as Positive-Polarized Array 1, Negative-Polarized Array 5, Positive-Polarized Array 4 and Negative-Polarized Array 8 of FIG. 2) are all coupled with uplink input ends of the unit.

Figure 1:
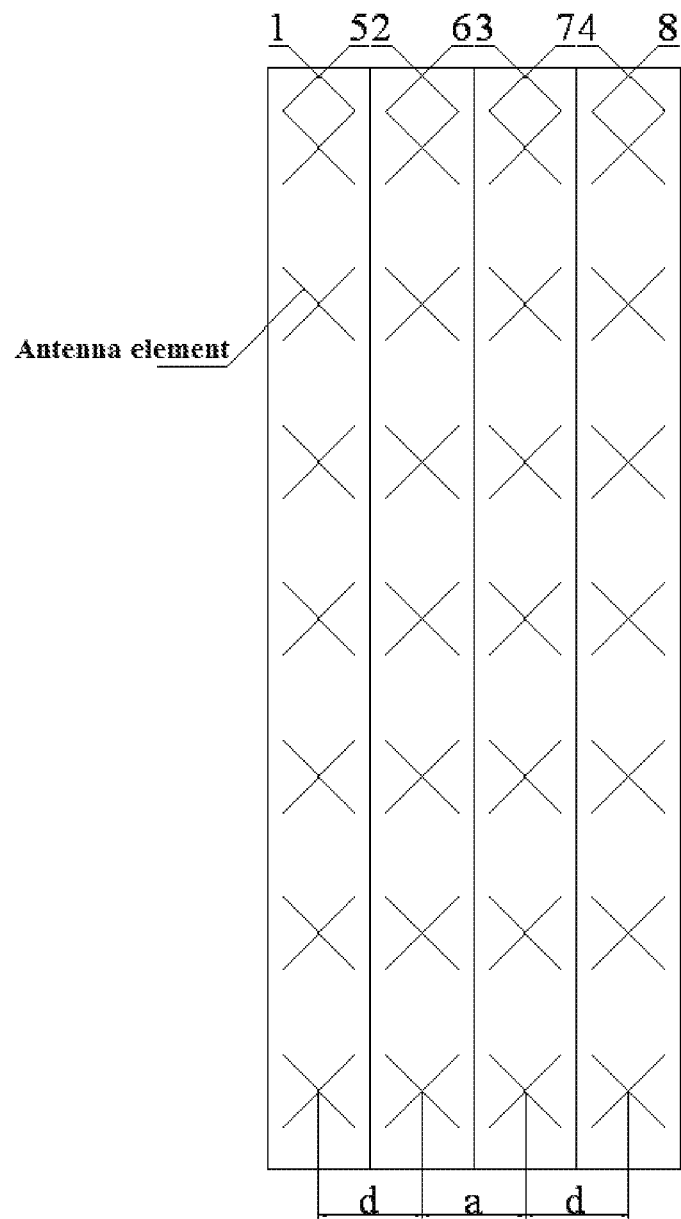
FIG. 1 is a structural diagram of a 2T8R (2-transmission and 8-reception) array antenna based on fixed beam-forming in the prior art.

Wherein, to form a downlink beam with 65-degree beamwidth, the space (i.e., "a" as shown in FIG. 1) between two adjacent linear arrays for transmitting downlink signals, e.g. second linear array and the third linear array, may be in a range of [0.35λ, 0.7λ]. The reason for taking the space between two adjacent linear arrays into account is that the correlation between two adjacent linear arrays is stronger and it is facilitated to control the beamwidth. In addition, in order to prevent cross-coupling between uplink signals, we hope the spaces between the linear arrays be as wide as possible. However, in practical applications, the size of the array antenna must be taken into account, and thereby the space (i.e., "d" as shown in FIG. 1) between two adjacent linear arrays for receiving uplink signals, such as, the space between the first linear array and the second linear array and the space between the third linear array and the fourth linear array, may be in a range of [λ/2, λ], wherein λ is the wavelength corresponding to the center operation frequency of the array antenna.

Particularly, the Positive-Polarized Array 1 and the Negative-Polarized Array 5, being two polarization units of the first linear array, are used for receiving signals (Uplink 1 and Uplink 2). The Positive-Polarized Array 4 and the Negative-Polarized Array 8, being two polarization units of the fourth linear array, are also used for receiving signals (Uplink 3 and Uplink 4), The Positive-Polarized Array 2 and the Negative-Polarized Array 6, the Positive-Polarized Array 3 and the Negative-Polarized Array 7, being two polarization units of the second linear array and the third linear array respectively, are divided into downlinks and uplinks by the uplink-downlink duplexers, wherein, the beam-forming networks are added on downlinks to form two beams having fixed shape for downlink transmission (i.e. Downlink 1 and Downlink 2), and the uplinks are used for receiving signals (Uplink 5, Uplink 6, Uplink 7 and Uplink 8). Further, the signals transmitted from downlinks of the second and third linear array are respectively formed beams having fixed shape through the beam-forming networks, and these beams are combined and transformed from the beams having the same polarization direction. For example, the beams from the Positive-Polarized Array 2 and the Positive-Polarized Array 3 are combined and transformed to a positive-polarized beam with 65-degree beamwidth, and the beams from the Negative-Polarized Array 6 and the Negative-Polarized Array 7 are combined and transformed to a negative-polarized beam with 65-degree beamwidth.

FIG. 2 shows a 2T8R array antenna based on fixed beam-forming. The beams combined and transformed from beams of two center linear arrays are used for transmission at the transmitting ends, and at the receiving ends, four linear arrays with totally 8 positive-polarized and negative-polarized arrays are used to receive signals. Therefore, a 2T8R array antenna is constructed and implemented.

In this embodiment, any two adjacent linear arrays of the array antenna may be used to form a beam with 65-degree beamwidth for the purpose of downlink transmission with a sectored pattern and a fixed beamwidth, while avoiding the issue of over-wide beamwidth caused by direct radiation of an individual linear array.

As shown in FIG. 2, at least one pair of adjacent linear arrays may be multiplexed as transceiving antennas. The linear arrays that are multiplexed as the transceiving antennas may be positioned in the center of the array antenna. When the linear arrays that are multiplexed as transceiving antennas are positioned in the center of the array antenna, the shaped beams have a favorable symmetry due to the symmetry on both of the antenna structure and the backplates, thus the two beams from downlinks can be overlapped well to some extent, which will be beneficial to the improvement of the downlink transmission rate of the MIMO system.

It can be seen from FIG. 2, two beams of downlink data are transmitted through two linear arrays to constitute a 2T8R array antenna.

Figure 3:
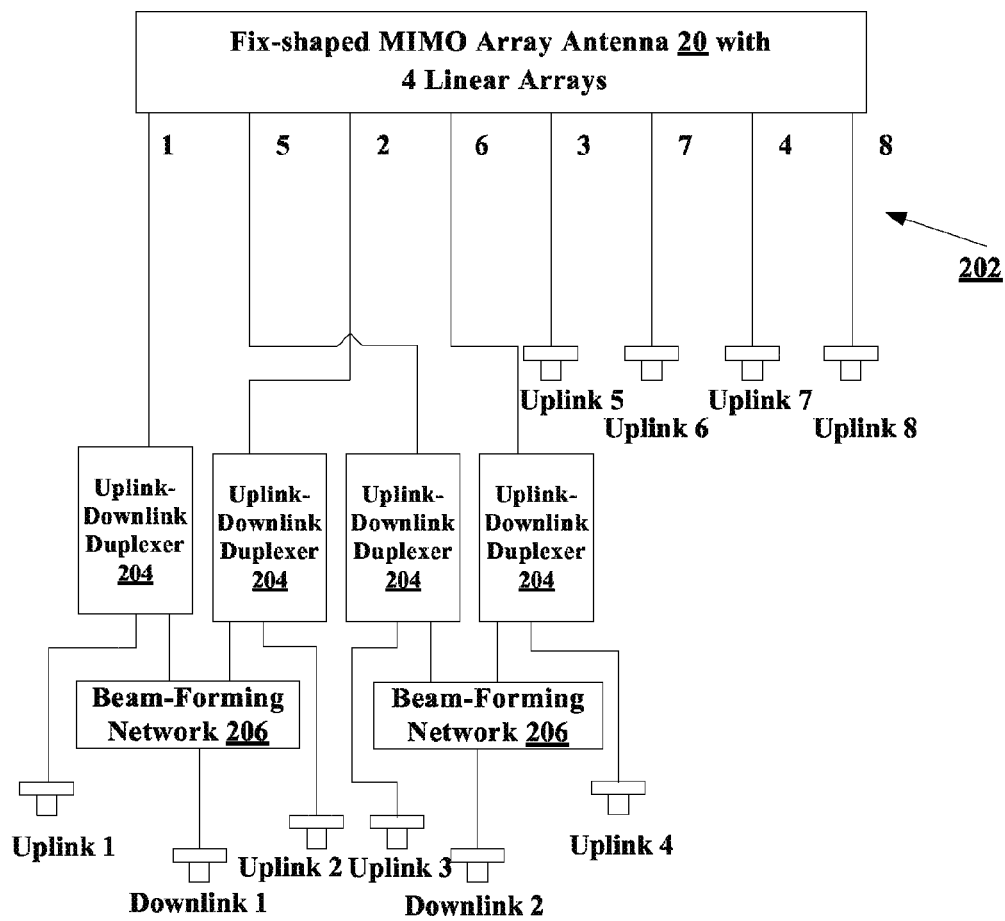
FIG. 3 is a structural diagram of the array antenna according to another embodiment of the disclosure.

FIG. 3 is a structure diagram of the array antenna according to another embodiment of this disclosure.

As shown in FIG. 3, two adjacent linear arrays at the most left side may be multiplexed as transceiving antennas. A positive-polarized beam with 65-degree beamwidth is formed using the Positive-Polarized Array 1, the Positive-Polarized Array 2 and a beam-forming network, and a negative-polarized beam with 65-degree beamwidth is formed using the Negative-Polarized Array 5, the Negative-Polarized Array 6 and a beam-forming network.

And so on, two positive-polarized/negative-polarized beams with 65-degree beamwidth may be formed respectively using the Positive-Polarized Array 3, the Positive-Polarized Array 4 and a beam-forming network or using the Negative-Polarized Array 7, the Negative-Polarized Array 8 and a beam-forming network.

Figure 4:
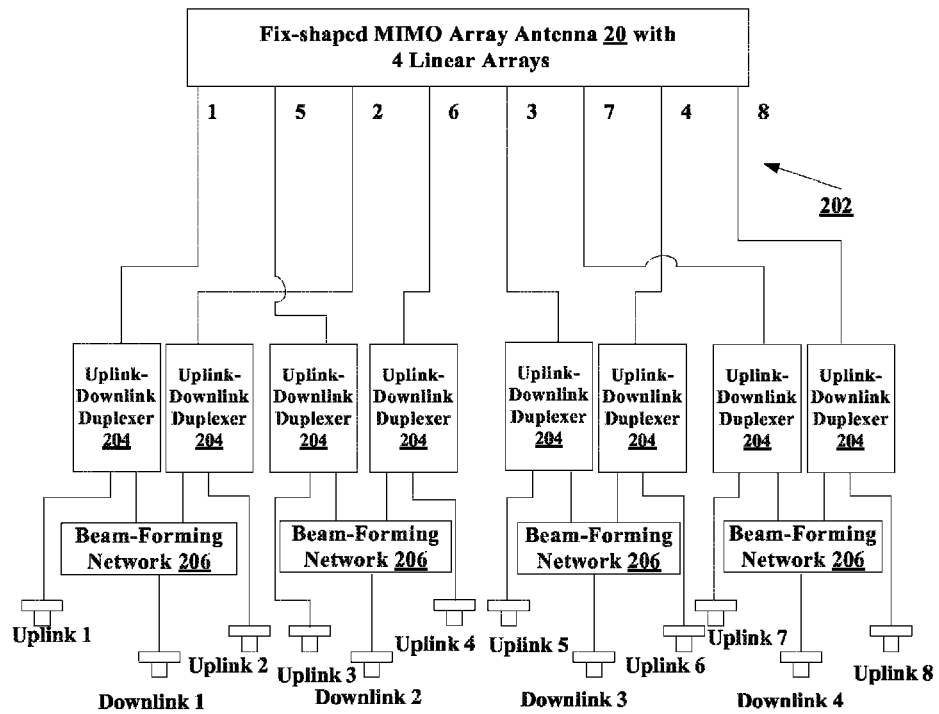
FIG. 4 is a structural diagram of the array antenna according to still another embodiment of the disclosure.

FIG. 4 is a structure diagram of the array antenna according to stilt another embodiment of this disclosure.

As shown in FIG. 4, four beams of downlink data may be transmitted by using four linear arrays. Particularly, four beams with 65-degree beamwidth from downlink may be formed respectively by using the Positive-Polarized Array 1, the Positive-Polarized Array 2 and a beam-forming network, by using the Negative-Polarized Array 5, the Negative-Polarized Array 6 and a beam-forming network, by using the Positive-Polarized Array 3, the Positive-Polarized Array 4 and a beam-forming network, and by using the Negative-Polarized Array 7, the Negative-Polarized Array 8 and a beam-forming network. In such a manner, a 4T8R MIMO array antenna can be constituted.

Note that, the array antenna of the embodiment described above may be applied to a base station to improve network service speed and link performance.

Various embodiments of this disclosure have been described in a progressive manner, wherein each embodiment just focuses on the difference from other embodiments. A mutual reference can be made to various embodiments for the same or similar portions thereof.

In the above embodiment of this disclosure, a beam having fixed shape is formed on the downlink direction only based on two antennas having the same polarization direction. In order to realize MIMO on the downlink direction, at least one positive-polarized beam with 65-degree beamwidth and a negative-polarized beam with 65-degree beamwidth may be formed, and downlink MIMO may be realized in a most effective manner when the two beams overlap with each other. Further, instead of a beam changing with user's position, the beam from downlink in the present disclosure may have fixed direction, and be capable of covering a complete sector.

Although some particular embodiments of this disclosure have been illustrated in detail, those skilled in the art may understand that the above exemplary embodiments are merely illustrative, rather than to being any limitation to the scope of this disclosure, and various changes or modifications may be effected to above embodiments by those skilled in the art without departing from the scope and spirit of this disclosure as defined in the appended claims.

What is claimed is:

1. An array antenna, comprising a plurality of linear arrays, uplink-downlink duplexers, and beam-forming networks, wherein,
   each of said linear arrays is a dual-polarized linear array including a positive-polarized array and a negative-polarized array;
   an input end of said beam-forming networks is coupled with a downlink signal output end of a radio frequency unit, and two output ends of said beam-forming networks are respectively coupled with downlink signal transmitting ends of two uplink-downlink duplexers configured to separate uplink and downlink output ends;
   shared transceiving ends of said two uplink-downlink duplexers are respectively coupled with arrays having the same polarization direction of two adjacent linear arrays, and the two adjacent linear arrays having the same polarization direction form a beam with 65-degree beamwidth on a downlink through the said beam-forming networks;
   uplink signal output ends of said two uplink-downlink duplexers are coupled with uplink signal input ends of said radio frequency unit; and
   arrays uncoupled with said uplink-downlink duplexers in the plurality of said linear arrays are all coupled with uplink signal input ends of said radio frequency unit respectively.

2. The array antenna according to claim 1, wherein the space between said two adjacent linear arrays for transmitting downlink signals is in a range of [0.35$\lambda$, 0.7$\lambda$], and the space between said two adjacent linear arrays for receiving uplink signals is in a range of [$\lambda$/2, $\lambda$], wherein the $\lambda$ is a wavelength corresponding to a center operational frequency of the array antenna.

3. The array antenna according to claim 1, wherein the array antenna comprises four of said linear arrays, wherein at least one pair of adjacent linear arrays are multiplexed as transceiving antennas.

4. The array antenna according to claim 3, wherein said linear arrays multiplexed as transceiving antennas are positioned in the center of the array antenna.

5. The array antenna according to claim 3, wherein two beams of downlink data are transmitted through two linear arrays.

6. The array antenna according to claim 3, wherein four beams of downlink data are transmitted through four linear arrays.

7. The array antenna according to claim 1, wherein each of the positive-polarized arrays and the negative-polarized arrays comprises at least two antenna elements.

8. A base station, comprising the array antenna according to claim 1.

* * * * *